United States Patent Office 3,480,097
Patented Nov. 25, 1969

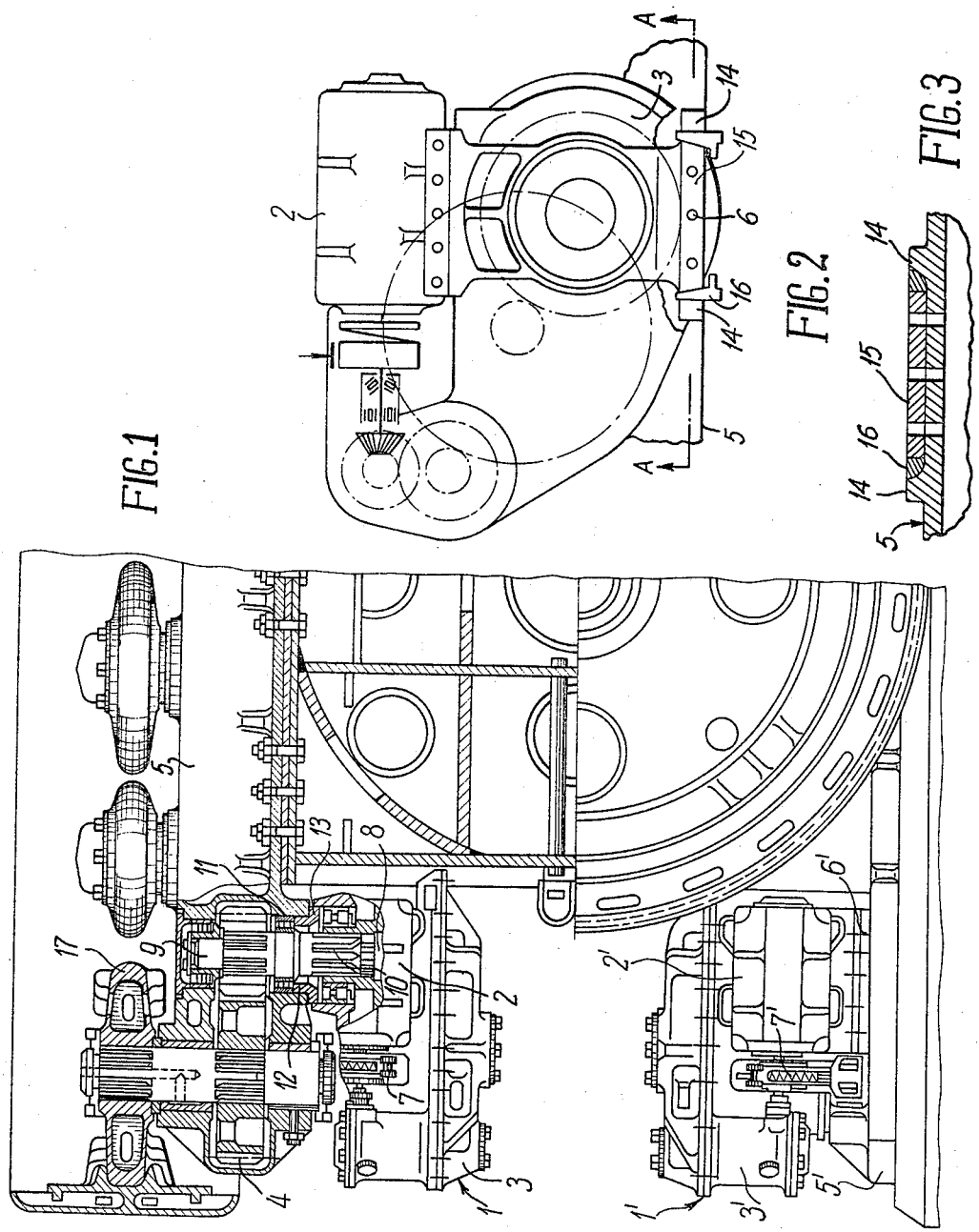

3,480,097
DRIVING MECHANISM OF DOUBLE-TRACK VEHICLES
Boris Ivanovich Solokhin, Kolpino, proezd Lenina 21, kv. 90; Gennady Nikolaevich Krauze, Kolpino ulitsa Very Slutskoi 16, kv. 37; and Alexandr Ivanovich Vargasov, Kolpino ulitsa Oktaybrskaya 37, kv. 41; all of Oblast, Leningradskaya, U.S.S.R.
Filed May 18, 1967, Ser. No. 639,390
Int. Cl. B62d 11/00
U.S. Cl. 180—6.48
3 Claims

ABSTRACT OF THE DISCLOSURE

A driving mechanism of double-track vehicles such as excavators, in which a separate drive is provided for each track. Each drive comprises a reduction gear with an output shaft projecting therefrom, said reduction gear being rigidly secured to the inner side of the track frame. A cap connects the reduction gear with the track frame and rests and wedges between the frame and the reduction gear prevent sliding movement therebetween. A motor with a brake is mounted on top of the reduction gear and a final drive means has a driving shaft with an end portion connected directly to the end portion of the output shaft of the reduction gear, such that they are prevented from sliding with respect to each other.

---

The present invention relates to driving mechanisms of double-track vehicles, and more particularly to driving mechanisms of excavators, having a single drive for each track and mounted on the inner side of the track frame.

Known are driving mechanisms of universal construction excavators and crawler cranes, having a single drive for each track and mounted on the inner side of the track frame.

The disadvantage of such mechanisms is that they have bulky intermediate transmission elements: cardan or other transmission shafts between the reduction gear and the motor, with the motor being located on the opposite side of the bogie; chain drives between the reduction gear of the driving mechanism and the driving wheels of the endless track drive; intermediate couplings between the reduction gear of the driving mechanism and the driving wheels of the endless track drive.

Another disadvantage of such mechanisms is that the motors and brakes are mounted on the lower frame of the bogie, which connects the driving mechanism with the lower frame and results in additional technological difficulties when manufacturing and assembling the bogie.

Because of the above-stated disadvantages, the designs of the driving mechanisms of universal construction excavators and crawler cranes, having a single drive for each track and providing satisfactory results only when the drive power is small (which is characteristic of universal construction excavators and crawler cranes) are not acceptable for large quarry excavators. Therefore, establishments specializing in manufacturing large quarry excavators have been employing for the driving mechanism of large quarry excavators a common drive from the lifting or turning mechanism, said drive being large in size and difficult to manufacture and operate. Recently, the Harnischfeger Co. has begun manufacturing quarry excavators with driving mechanisms wherein the reduction gear and the motor are mounted on a turnable platform and power is transmitted to the driving wheels of the endless track drive via a vertical shaft passing through the central journal of the excavator.

An object of the present invention is to eliminate the afore-mentioned disadvantages of driving mechanisms.

In the accomplishment of the above and other objects of the invention, in the driving mechanism the motor and the brake of each single drive and mounted on the upper portion of the reduction gear rigidly connected to the track frame for example, by bolts whereas the output shaft end portion of the reduction gear is directly connected to the driving shaft of the final drive means so as to exclude their mutual sliding.

It is most feasible to use a splined coupling of said shafts.

In order to relieve the driving shaft of the final drive means from the reactive torque, the reduction gear is additionally fastened to the track frame by means of a cover entering a hole made in the casing of the reduction gear and having a cylindrical projection entering a cylindrical hole provided in the track frame. To resist the torque, the track frame is provided with rests, in which a lower claw of the reduction gear is secured by means of wedges.

The following detailed description of an embodiment of the present invention is given with reference to the accompanying drawings, in which:

FIG. 1 is a top view partly in section of a driving mechanism in accordance with the present invention;

FIG 2 is a side view of the drive, the track frame being omitted;

FIG. 3 is a sectional view taken along lines A—A in FIG. 2.

The driving mechanism consists of two single drives 1, 1' (FIG. 1), each drive having an electric motor 2, 2', a reduction gear 3, 3' and a final drive means 4. The reduction gear 3, 3' is rigidly fastened to a track frame 5, 5' by means of bolts 6, 6'. The motor 2, 2' with a brake 7, 7' is mounted on the upper portion of the reduction gear 3, 3'. A hollow output shaft 8 of the reduction gear 3, 3' is connected to a driving shaft 9 of the final drive means 4 by means of a splined coupling 10.

The frame 5, 5' has a cylindrical hole 11 into which is received a cylindrical projection 12 of a cap 13 entering a hole in the casing of the reduction gear 3, 3' body. Besides, the track frame 5, 5' has rests 14 wherein a lower claw 15 (FIG. 2) of the reduction gear 3, 3' is wedged with the aid of wedges 16.

Due to such mounting of the reduction gear 3, 3' on the frame 5, 5', the reactive torque is received by the projection 12 and the rests 14, which makes it possible to relieve the driving shaft 9 of the final drive means of said reactive torque.

The rotation from the motor 2, 2' is transmitted directly to a driving wheel 17 of the endless track drive through the reduction gear 3, 3' and final drive means 4.

What is claimed is:

1. A driving mechanism of double-track vehicles, comprising a track frame, a separate drive for each track of the vehicle, said drive comprising a reduction gear with an output shaft projecting therefrom, said reduction gear being rigidly secured to the track frame; a cap connecting the reduction gear with the track frame; rests on the frame and wedges between the frame and the reduction gear for preventing the reduction gear from sliding relative to the track frame; a motor with a brake mounted on said reduction gear; and a final drive means with a driving shaft having an end portion connected directly to the end portion of the output shaft of the reduction gear such that they are prevented from slipping with respect to each other.

2. A driving mechanism as claimed in claim 1, wherein the end portion of the driving shaft of the final drive means and the end portion of the output shaft of the reduction gear include a splined joint.

3. A driving mechanism as claimed in claim 1, wherein said cap includes a cylindrical projection surrounding said output shaft and entering a cylindrical hole provided in the track frame.

References Cited

UNITED STATES PATENTS

| 2,678,105 | 5/1954 | Peterson | 180—6.48 |
| 2,833,360 | 5/1958 | Spanjer | 180—6.48 |
| 2,940,532 | 6/1960 | Lear et al. | 180—6.48 |
| 3,168,927 | 2/1965 | Garner | 180—6.48 |

LEO FRIAGLIA, Primary Examiner

J. A. PEKAR, Assistant Examiner